United States Patent
Lysne et al.

(10) Patent No.: US 7,817,539 B2
(45) Date of Patent: Oct. 19, 2010

(54) RESILIENT ROUTING SYSTEMS AND METHODS

(75) Inventors: Olav Lysne, Lysaker (NO); Amund Kvalbein, Lysaker (NO); Audun Fosselie Hansen, Lysaker (NO); Stein Gjessing, Lysaker (NO); Tarik Cicic, Lysaker (NO)

(73) Assignee: Resiliens AS, Lysaker (NO)

( * ) Notice: Subject to any disclaimer, the term of this patent is extended or adjusted under 35 U.S.C. 154(b) by 579 days.

(21) Appl. No.: 11/436,474

(22) Filed: May 17, 2006

(65) Prior Publication Data

US 2007/0070883 A1 Mar. 29, 2007

Related U.S. Application Data (60) Provisional application No. 60/682,114, filed on May 17, 2005.

(30) Foreign Application Priority Data

Feb. 15, 2006 (GB) .................................. 0603080.3

(51) Int. Cl.
*H04L 1/00* (2006.01)
(52) U.S. Cl. ........................................ 370/219; 370/238
(58) Field of Classification Search ................. 370/254, 370/351, 229, 225, 219, 238; 709/241, 238; 714/4
See application file for complete search history.

(56) References Cited

U.S. PATENT DOCUMENTS 6,802,021 B1 * 10/2004 Cheng et al. .................. 714/4
7,173,912 B2 * 2/2007 Jaber et al. ................... 370/254
2003/0058798 A1 * 3/2003 Fleischer et al. ............. 370/238
2004/0205239 A1 * 10/2004 Doshi et al. .................. 709/241
2004/0221058 A1 * 11/2004 de Boer et al. ............... 709/238
2005/0152269 A1 * 7/2005 Liu .............................. 370/225
2006/0209682 A1 * 9/2006 Filsfils et al. ................ 370/219

OTHER PUBLICATIONS

Michael Menth et al.; *Network Resilience through Multi-Topology Routing*; University of Wurzburg Institute of Computer Science, Germany; Report No. 335; May 2004.

Ingebjorg Theiss et al.; *FROOTS—Fault Handling in Up /Down Routed Networks with Multiple Roots*; Simula Research Laboratory, Norway.

* cited by examiner

*Primary Examiner*—Kwang B Yao
*Assistant Examiner*—Syed Bokhari
(74) *Attorney, Agent, or Firm*—Steven M. Jensen; Brian R. Landry; Edwards Angell Palmer & Dodge LLP (57) ABSTRACT

A network comprises nodes and links. In addition to a default topology there are backup configurations. Each node is inhibited from transferring data between nodes in at least one backup configuration. When a node detects a fault in the reception of data transmitted to a neighbouring node, it switches to a backup configuration in which the neighbouring node is inhibited. In one arrangement a backup configuration has at least one link which is restricted by having a high weighting so that it transmits data to a node only if that node is the final destination node for that data. Additionally, if the neighbouring node is the final destination, and routing of data is still unsuccessful in the backup configuration, the detecting node selects and switches to an alternate backup configuration in which the detecting node is inhibited.

10 Claims, 5 Drawing Sheets

(1) $S = \text{artPoints}(G)$;
    while $(S \neq V)$
        $L_i = G$; $V' = V \setminus S$;
        foreach $n \in V'$
            if $(n \notin \text{artPoints}(L_i))$
(2)                 $E' = \text{links}(n, L_i)$;
(3)                 $L_i = L_i \setminus \{l_j \in E' \mid 1 \leq j < |E'|\}$;
                $S = S \cup \{n\}$;
            endif
        endfor
        *store layer $L_i$;*
        $i = i + 1$;
    endwhile (4) balanceLayers();

Figure 4

Figure 5 foreach $p_i \in \mathcal{P}$
    foreach $L \in \mathcal{L}$
(1)     *create LSP* $g_i^l = \text{sp}(n_i^1, n_i^{m_i}, L)$
    endfor
    for $j = 2$ to $m_i - 2$
(2)     *create LSP* $q_i^j = \text{sp}(n_i^j, n_i^{m_i}, L(n_i^{j+1}))$
    endfor
(3) if $(\text{link}(n_i^{m_i-1}, n_i^{m_i}) \in L(n_i^{m_i}))$
(4)     if $(\text{link}(n_i^{m_i-1}, n_i^{m_i}) \in L(n_i^{m_i-1}))$
        *choose neighbor $n'$ of $n_i^{m_i-1}$ so that $n' \neq n_i^{m_i}$*
        *create LSP* $q_i^{m_i-1} = n_i^{m_i-1} \vdash \text{sp}(n', n_i^{m_i}, L(n_i^{m_i-1}))$
    else
(5)         *create LSP* $q_i^{m_i-1} = \text{sp}(n_i^{m_i-1}, n_i^{m_i}, L(n_i^{m_i-1}))$
    endif
    else
(6)     *create LSP* $q_i^{m_i-1} = \text{sp}(n_i^{m_i-1}, n_i^{m_i}, L(n_i^{m_i}))$
    endif
endfor

Figure 6

――――――― Restricted Link

Figure 7

―・―・―・― Disabled Link

Figure 8

```
1  for p ∈ {0...n − 1} do
2      G_p ⇐ G
3      S_p ⇐ ∅
4  end
5  p ⇐ 0
7  forall v_i ∈ V do
9      while v_i ∉ S_p and not all configurations
         tried do
11         if !div(v_i, G_p) then
13             forall e_{i,j} ∈ E_i do
15                 if ∃q : v_j ∈ S_q then
16                     if w^q_{i,j} = W then
18                         if ∃e_{i,k} ∈ E_i \ e_{i,j} : w^p_{i,k} ≠ ∞ then
20                             w^p_{i,j} ⇐ ∞
21                         else
23                             break 9

25                     else if w^q_{i,j} = ∞ and p ≠ q then
27                         w^p_{i,j} ⇐ W 29
30                 else
32                     if ∃e_{i,k} ∈ E_i \ e_{i,j} : w^p_{i,k} ≠ ∞ then
34                         w^p_{i,j} ⇐ ∞
35                     else
37                         w^p_{i,j} ⇐ W
39                         firstInNodeQ(v_j)
41                         firstInLinkQ(v_j, e_{j,i})

43             commit edge weight changes
44             S_p ⇐ S_p ∪ v_i
45         p + + mod n
46     if v_i ∉ S_p then
48         Give up and abort
49 end
```

Figure 9

| | |
|---|---|
| $G(V, E)$ | Graph with nodes $V$ and undirected links $E$ |
| $G_p$ | The graph with link weights as in configuration $p$ |
| $S_p$ | Isolated nodes in configuration $p$ |
| $E_i$ | All links from node $i$ |
| $e_{i,j}$ | Undirected link from node $i$ to node $j$ ($e_{i,j} = e_{j,i}$) |
| $w^p_{i,j}$ | Weight of link $e_{i,j}$ in configuration $p$ |
| $n$ | Number of configurations to generate (input) |
| $W$ | Weight of restricted links |

RESILIENT ROUTING SYSTEMS AND METHODS

RELATED APPLICATION

This application claims priority from U.S. Provisional Patent Application 60/682,114, filed May 17, 2005 and UK Patent Application No. 0603080.3, filed Feb. 15, 2006.

FIELD OF THE INVENTION

This invention relates to the routing of data, for example packets or streams of data in a computer or communications network.

Typically, such a network comprises nodes and links. Nodes are components which transmit, receive or route data, i.e. receive data and then transmit the data to another node. Nodes may comprise routers or other data processing apparatus. Links are the connections between nodes, over which the data is transmitted. These may be hard wired links, such as copper or optical fibre links, or may be wireless using, for example, microwaves or other forms of radio or other wireless transmission.

In many environments it is critical that data continues to be transmitted over a network even though a node or a link fails. Network topologies are designed so that, as far as possible, if a node ceases to function data will continues to be transmitted amongst the remaining nodes. Similarly, so far as possible, if a link fails then data can continue to be transmitted between the nodes at the ends of the link, but via an alternative path using one or more other links in the network.

The present invention is concerned primarily with improving the resilience of a network in the event of the failure of a node or a link. A failure of a node or link may be complete, or such as to provide an unacceptable degradation in service, for example if a link ceases to provide the usual speed of data transmission or a node fails to route data in a reliable fashion.

BACKGROUND TO THE INVENTION

In recent years the Internet has been transformed from a special purpose network to an ubiquitous platform for a wide range of everyday communication services. The demands on Internet reliability and availability have increased accordingly. A disruption of a link in central parts of a network has the potential to affect hundreds of thousands of phone conversations or TCP connections, with obvious adverse effects.

The ability to recover from failures has always been a central design goal in the Internet. See D. D. Clark, "The Design Philosophy of the DARPA Internet Protocols," SIG-COMM, Computer Communications Review, vol. 18, no. 4, pp. 106-114, August 1988. IP networks are intrinsically robust, since IGP routing protocols like OSPF are designed to update the forwarding information based on the changed topology after a failure. This re-convergence assumes full distribution of the new link state to all routers in the network domain. When the new state information is distributed, each router individually calculates new valid routing tables.

This network-wide IP re-convergence is a time consuming process, and a link or node failure is typically followed by a period of routing instability. During this period, packets may be dropped due to invalid routes. This phenomenon has been studied in both IGP (A. Basu and J. G. Riecke, "Stability Issues in OSPF Routing," in *Proceedings of SIGCOMM 2001*, August 2001, pp. 225-236) and BGP context (C. Labovitz, A. Ahuja, A. Bose, and F. Jahanian, "Delayed Internet Routing Convergence," *IEEE/ACM transactions on Networking*, vol. 9, no. 3, pp. 293-306, June 2001) and has an adverse effect on real-time applications (C. Boutremans, G. Iannaccone, and C. Diot, "Impact of link failures on VoIP performance," in *Proceedings of international Workshop on Network and Operating System Support for Digital Audio and Video*, 2002). Events leading to a re-convergence have been shown to occur frequently, and are often triggered by external routing protocols (D. Watson, F. Jahanian, and C. Labovitz, "Experiences with monitoring OSPF on a regional service provider network," in ICDCS '03: *Proceedings of the 23rd International Conference on Distributed Computing Systems*. IEEE Computer Society, 2003, pp. 204-213).

Much effort has been devoted to optimizing the different steps of the convergence of IP routing, i.e., detection, dissemination of information and shortest path calculation, but the convergence time is still too large for applications with real time demands. A key problem is that since most network failures are short lived (A. Markopoulou, G. Iannaccone, S. Bhattacharyya, C.-N. Chuah, and C. Diot, "Characterization of failures in an IP backbone network," in *Proceedings of INFOCOM 2004*, March 2004) too rapid triggering of the reconvergence process can cause route flapping and increased network instability.

The IGP convergence process is slow because it is reactive and global. It reacts to a failure after it has happened, and it involves all the routers in the domain.

In "FROOTS—Fault Handling in Up*/Down* Routed Networks with Multiple Roots", by Ingebjørg Theiss and Olav Lysne, one of the con-inventors of the present application, Proceedings of the International Conference on High Performance Computing HiPC 2003, Springer-Verlag, the contents of which are incorporated herein by way of reference, there is disclosed an improved system for handling faults in networks. A number of virtual configuration layers are created, and each node is made safe in one of these layers, i.e. by being made a leaf node in that layer so that data is not directed through that node to any other node. When a node fault is registered by the source node, the source node can choose a safe layer for the faulty node, and then transmit data according to the new configuration defined in that layer. If there is a faulty link, there will be two nodes attached to the faulty link, and a safe layer is chosen for one of these nodes, on an arbitrary basis. It is possible using the system described to have a relatively small number of layers, and for example it is shown that for a network with 16 k nodes and 64 k links it is possible to obtain coverage using a maximum of 8 layers.

Such an arrangement has advantages over previous systems, but in practice there may be delays in switching to an alternative layer when there is a fault in a node or a link, and there are some limitations as to the versatility of the system.

SUMMARY OF THE INVENTION

The present invention provides a method of routing data over a network comprising a plurality of nodes and a plurality of links interconnecting the nodes, wherein there is a default configuration in which data may be exchanged between any two nodes in the network using the links and nodes of the network, and nodes in the network are configured to route data in accordance with that default configuration; and wherein there is provided a plurality of backup configurations in which nodes in the network are configured to route data in accordance with the respective backup configuration, the nodes having that plurality of backup configurations stored for use when necessary; for each node there being at least one of the backup configurations in which that node is inhibited from acting in the transit of data between nodes; the nodes being configured so that when a node detects a fault in the reception of data that has been transmitted to a neighbouring node, the detecting node selects and switches to a backup configuration in which said neighbouring node is inhibited so that data which is transmitted from the detecting node is routed in accordance with the selected backup configuration without transit through said neighbouring node.

Thus, the choice of the backup configuration is made by the node which detects that there is an error. The detecting node does not need to know whether it is the neighbouring node that has failed, or the link between it and the neighbouring node. Provided the configuration is such that the neighbouring node is not involved in the transit of traffic, then the remainder of the network will continue to operate normally.

In this specification, a router which is inhibited from acting in the transmission of data may be referred to as "safe" or "isolated" or "inhibited". A link which is not involved at all in the transmission of data may be referred to as "disabled" or "isolated". A link which may be used in the transmission of data in certain circumstances, as discussed below, may be referred to as "restricted".

It will be appreciated that a node may be inhibited, or a link restricted or disabled, even when there is no physical problem with the component concerned. For example, a "disabled" link is one which is not used in a particular configuration, even though there may be no physical problem with the link.

A problem arises if the neighbouring node is in fact the "final hop", i.e. the final destination for the data before it leaves the network. In that case, when the detecting node looks up where it is to transmit the data in the backup configuration in which the neighbouring node is safe, the same link may be returned as in the default configuration. In this event, the detecting node selects an alternative backup configuration in which the detecting node is safe.

In any given default configuration, there may be a number of nodes which are safe. A safe node can be the source of data, or can receive data as the final hop in the transmission over the network, but cannot forward received data to another node in the network. A simple way of doing this is to eliminate all but one link to the safe node. However, in accordance with another aspect of the invention, the method may involve retaining a plurality of links to a safe node, but each of these links will be given a high weighting—so that in calculating a route for data, none of these links would be used unless absolutely necessary, i.e. unless the safe node is the final destination in the network for the data. This allows for greater versatility in routing the data than by providing just a single active link to the safe node.

In general, a link which permits the traffic of data in some circumstances, and in particular when supplying data to an inhibited router which is the final destination for the data, may be referred to as "restricted". Weighting may be used to restrict a link. If a link has failed, then it must be disabled, and this can be done by giving it very high weighting—for example infinite—so that it is not used at all for the transmission of data to or from the safe node.

An objective of the invention is therefore to guarantee that there exist configured paths from sources to destinations in the network even when components have failed.

A further objective of the invention is to give almost continuous forwarding of packets in the case of a failure. The component that detects the failure may initiate a local rerouting immediately, without communicating with its surrounding neighbours.

A further objective of the invention is to help improve network availability through suppression of the re-convergence process. Delaying this process is useful to address transient failures, and pays off under many scenarios.

A further objective of the invention is to use a single mechanism to handle both link and router failures. Failures are handled locally by the detecting router.

A further objective of the invention is to make no assumptions with respect to the root cause of failure, e.g., whether the packet forwarding is disrupted due to a failed link or a failed router.

A further objective of the invention is to be applicable in IP-networks without major modifications to existing IGP routing standards.

Viewed from one aspect the invention provides a method of routing data over a network comprising a plurality of nodes and a plurality of links interconnecting the nodes, wherein there is a default configuration in which data may be exchanged between any two nodes in the network using the links and nodes of the network, and nodes in the network are configured to route data in accordance with that default configuration; and wherein there is provided a plurality of backup configurations in which nodes in the network are configured to route data in accordance with the respective backup configuration, the nodes having that plurality of backup configurations stored for use when necessary; for each node there being at least one of the backup configurations in which that node is inhibited from acting in the transit of data between nodes; the nodes being configured so that when a node detects a fault in the reception of data that has been transmitted to a neighbouring node, the detecting node selects and switches to a backup configuration in which said neighbouring node is inhibited so that data which is transmitted from the detecting node is routed in accordance with the selected backup configuration without transit through said neighbouring node; and wherein in at least one backup configuration at least one link is restricted by being provided with a weighting that is significantly higher than the weighting that it has in the default configuration, so that the restricted link will transmit data to a node to which the link is connected only if that node is the final destination node for that data.

Viewed from another aspect, the present invention provides a method of routing data over a network comprising a plurality of nodes and a plurality of links interconnecting the nodes, wherein there is a default configuration in which data may be exchanged between any two nodes in the network using the links and nodes of the network, and nodes in the network are configured to route data in accordance with that default configuration; and wherein there is provided a plurality of backup configurations in which nodes in the network are configured to route data in accordance with the respective backup configuration, the nodes having that plurality of backup configurations stored for use when necessary; for each node there being at least one of the backup configurations in which that node is inhibited from acting in the transit of data between nodes; the nodes being configured so that when a node detects a fault in the reception of data that has been transmitted to a neighbouring node, the detecting node selects and switches to a backup configuration in which said neighbouring node is inhibited so that data which is transmitted from the detecting node is routed in accordance with the selected backup configuration without transit through said neighbouring node; and wherein in the event that the neighbouring node is the final destination in the network for particular data, and the backup configuration selected by the detecting node, in which the neighbouring node is inhibited, results in unsuccessful routing of the particular data to the neighbouring node, the detecting node selects and switches to an alternate backup configuration in which said detecting node is inhibited, and subsequent routing of that particular data is in accordance that alternate backup configuration.

The invention is based on using a small set of backup routing configurations, where each of them is resistant to failures of certain routers and links. Given the original network topology, a configuration is defined as a restriction put upon a set of components of the network that no packets or streams should traverse them to reach other parts of the network.

In a configuration that is resistant to the failure of a router, traffic routed according to this configuration is never routed through that router. The failure of the router then only affects traffic that is sent from or destined to it. Similarly, in a configuration that is resistant to failure of a link, traffic routed in this configuration is never routed over this link, hence no traffic routed in this configuration is lost if the link fails.

In the invention, the router and link are "isolated" in a configuration, when, as described above, no traffic routed according to this configuration is routed through the router or link.

In addition to the original configuration where in most cases no components are isolated, the invention provides a small set of backup configurations, so that every network component is isolated in at least one backup configuration. The number of needed configurations can be calculated based on the network topology.

For each configuration, any routing algorithm can be used to calculate configuration specific paths from sources to destinations for packets and streams. For simplicity, one can say that paths for a packet or stream are calculated according to a configuration, meaning that the path is compatible with the restrictions on isolated and restricted components in that configuration.

The invention contains a forwarding process that takes advantage of the backup configurations to provide fast recovery from a component failure.

Router failures can be handled through blocking a router from transiting traffic. This router blocking will normally also protect the attached links. But a link failure in the last hop of a path can obviously not be recovered by blocking the downstream router. Hence, one must make sure that, in one of the backup configurations, there exists a valid path to the last hop router, without using the failed link.

Several routers and links can be isolated in the same configuration. In a backup configuration like this, packets will not be routed over isolated links, and only in the first or the last hop will be routed over the restricted links.

Using a suitable path calculation algorithm, the invention calculates a set of paths from sources to destinations for packets and/or streams. This can happen either explicitly, or implicitly through routing or forwarding tables or in any other way. When a packet or stream reaches a point of failure, it is switched to a backup configuration, and is forwarded to its destination according to that configuration. The packet or packets are modified to indicate that they are to be routed in accordance with the backup configuration, for example by modifying the packet header or by adding a new header, or by any other suitable means. The next router in the backup configuration receives the packet, reads the data concerning the configuration, and then looks up in that configuration how the packet is to be routed. The packet will then be routed in accordance with the selected backup configuration, and the same procedure will be carried out at each router the packet passes through.

The new configuration may be implemented only for links and routers which are downstream of any router which neighbours the failed link or node. The error detected could be notified back to the source so that all routers are changed to the new configuration. This could be done when the error is detected by the node neighbouring the failed node or link, or after the detecting node has already forwarded the data in accordance with the new configuration. Implementing an appropriate new configuration across the network could result in more efficient routing than simple starting from the detecting node.

A new configuration may apply to all data but preferably is implemented only for data which would otherwise be routed over the failed link or router. To simplify matters and increase speed, a new configuration may remain in place and be applicable to all relevant data, until such time as a command is received to revert to the default configuration—for example after a network administrator has dealt with the failed link or router.

It is not necessary to guarantee that all links and/or all routers are isolated in at least one configuration. If for some reason one should choose only to protect some of the components, the invention will still work for this purpose. Thus, references to nodes and links in a network do not imply that all nodes or links are involved in the configuration changes. The network which is relevant for the purposes of the claimed invention may be a sub-set of a larger network.

It is not necessary to prohibit all bypass traffic from isolated components. If for some reason only some of the traffic needs to be secured, the invention can be used by letting isolated routers be isolated only from parts of the traffic.

The invention can be used completely without restricted links.

The invention can be used without having default configuration in which no routers or links are isolated. For example, the topology may be such that there are isolated routers in any event with only a single link to the remainder of the network, or routers that for some other reason are never used for the transit of data in any event. One or more links may be of reduced bandwidth compared to the rest, for example, and may therefore be restricted and used only where absolutely necessary—for example by giving them a high weighting.

The invention can be used in an end-to-end mode, where the decision to use a specific configuration is taken at the outset of the paths of the packets or the streams, and not at some point in the middle of the path.

The notion of configuration with isolated and restricted components can be implemented in a multitude of different ways. A non-exhaustive list is; by tuning weights in OSPF, RIP and IS-IS, by policies in BGP, by LSP's in MPLS, by light-paths in optical networks and by source routing.

In this specification the invention is described using terminology from computer networks. In particular a packet denotes a unit of transportation, a stream denotes a continuous flow of packets, a link denotes a communication medium that is able to move packets and streams from one geographical place to another, and a router denotes a component that is attached to a set of links. The choice of names does not limit the scope of the invention to computer networks. Furthermore the scope includes networks that use other names than those chosen for components or sets of components with the same functionality. In particular, both links and routers may themselves be implemented by networks, wired or wireless. Furthermore both links and routers can themselves be sub-networks.

The invention is concerned with packets or streams that are to be moved from one place in the network to another, and where the network needs to find a way for the stream or the packet around one or more faulty routers and links. This motivation is for description purposes only. The scope of the invention covers one-to-many/all communication, many/all-to-one communication and many/all-to-many/all communication as well. Furthermore the scope of the invention includes, but is not limited to, situations where the reason for routing around components or set of components is that they are faulty.

The preferred embodiment of the invention is referred to in this specification as Multiple Routing Configurations (MRC). This system is proactive and local, which allows recovery in the range of milliseconds. MRC allows packet forwarding to continue over pre-configured alternative next-hops immediately after the detection of the failure. Using MRC as a first line of defense against network failures, the normal IP convergence process can be put on hold. This process is then initiated only as a consequence of non-transient failures. Since no global rerouting is performed, fast failure detection mechanisms like fast hellos or hardware alerts can be used to trigger MRC without compromising network stability. MRC guarantees recovery from any single link or node failure, which constitutes a large majority of the failures experienced in a network.

The main idea of MRC is to use the network graph and the associated link weights to produce a small set of backup network configurations. The link weights in these backup configurations are manipulated so that for each link and node failure, and regardless of whether it is a link or node failure, the node that detects the failure can safely forward the incoming packets towards the destination. MRC assumes that the network uses shortest path routing and destination based hop-by-hop forwarding.

In the prior art, it is sometimes claimed that the node failure recovery implicitly addresses link failures too, as the adjacent links of the failed node can be avoided. This is true for intermediate nodes, but the destination node in a network path must be reachable if operative. MRC solves the "last hop" problem by strategic assignment of link weights between the backup configurations. MRC has a range of attractive features.

It gives almost continuous forwarding of packets in the case of a failure. The router that detects the failure initiates a local rerouting immediately, without communicating with the surrounding neighbours.

MRC helps improve network availability through suppression of the re-convergence process. Delaying this process is useful to address transient failures, and pays off under many scenarios. Suppression of the reconvergence process is further actualized by the evidence that a large proportion of network failures is short-lived, often lasting less than a minute.

MRC uses a single mechanism to handle both link and node failures. Failures are handled locally by the detecting node, and MRC always finds a route to the destination (if operational).

MRC makes no assumptions with respect to the root cause of failure, e.g., whether the packet forwarding is disrupted due to a failed link or a failed router. Regardless of this, MRC guarantees that there exists a valid, pre-configured next-hop to the destination.

An MRC implementation can be made without major modifications to existing IGP routing standards. IETF has initiated specifications of multi-topology routing for OSPF and IS-IS, and this approach seems well suited to implement the proposed backup configurations.

In the graph-theoretical context, one embodiment of the present invention is based on calculating spanning sub topologies of the network, called layers. Each layer contains all nodes but only a subset of the links in the network. The preferred embodiment does not alter topologies by removing links, but rather by manipulating link weights to meet goals of handling both node and link failures without needing to know the root cause of the failure. In MRC, all links remain in the topology, but in some configurations, some links will not be selected by shortest path routing mechanisms due to high weights.

It will be appreciated that various aspects of the invention can be used in various combinations. For example, the use of weighting and other inventive features may be incorporated in a system, which does not use local detection and reconfiguration, but requires global reconfiguration. Similarly, the use of the safe layer for the failed link/router as a first step, followed by the safe layer for the detecting node if that does not work, can be used in an environment using global reconfiguration. The various algorithms described below for calculating the required layers will be applicable whatever means is adopted for detecting failures and implementing reconfiguration.

The invention extends to methods of operating a network, as well as to a data processing system in the form of a network of nodes and links configured to operate in accordance with the invention. The invention also extends to data processing apparatus in the form of a node, such as a router, configured to operate in accordance with the invention.

DESCRIPTION OF THE PREFERRED EMBODIMENTS

Some embodiments of the invention will now be described by way of example and with reference to the accompanying drawings, in which.

The first embodiment is referred to as "Resilient Routing Layers" (RRL) and is based on calculating redundant subsets of the network topology that are called layers. Each layer contains all nodes but only a subset of the links in the network. A node is safe in a layer if only one of its links is contained in that layer. A safe layer for a node denotes a layer in which the node is safe. The layers are used as input to routing or path-finding algorithms, calculating a routing table or path table for each layer. For each layer an algorithm is used to find loop-free paths between all pairs of source and destination. Therefore all pairs of nodes can reach each other in any layer.

The following criteria apply:
1. In a safe layer for a given node, this node will not experience transit traffic.
2. If a node fails, any safe layer for that node keeps an intact path between all pairs of sources and destinations that are distinct from the node itself.
3. If a node fails, traffic sourced by or destined for the failed node will be lost under any circumstance.

In order to use RRL as a basis for a complete method for recovery, it is necessary to generate layers in such a way that all nodes that are not articulation points are safe in at least one layer. As demonstrated later on, this can be achieved with relatively few layers.

The concept above can be used both for global and local recovery. In global recovery the packets that should have traversed the failed node are made to use the node's safe layer from the source. In local recovery, the node upstream of the failed node transfers the packet to the safe layer of the failed node when the packets arrive.

RRL handles link-faults as follows. First, a leaf link is defined as the link connecting a safe node to the network. A safe layer of a link can be defined as the safe layer of its downstream node n as long as n is not the final destination and its leaf link is not the failed link. If the downstream node n is the final destination and its leaf link is the failed link, there are two options:

1. Use the safe layer of the detecting node (upstream node) as long as its leaf link is not the failed link.
2. If the leaf link is the failed link, the safe layer of the upstream node is still the safe layer of the link, but the upstream node deflects the traffic to another link. The safe layer of the detecting node will route no traffic through this node, and hence the traffic will not loop back to the failure.

Since link failures are handled using the safe layer of a node, most of the following examples and evaluations will focus on node failures.

Figure 1:
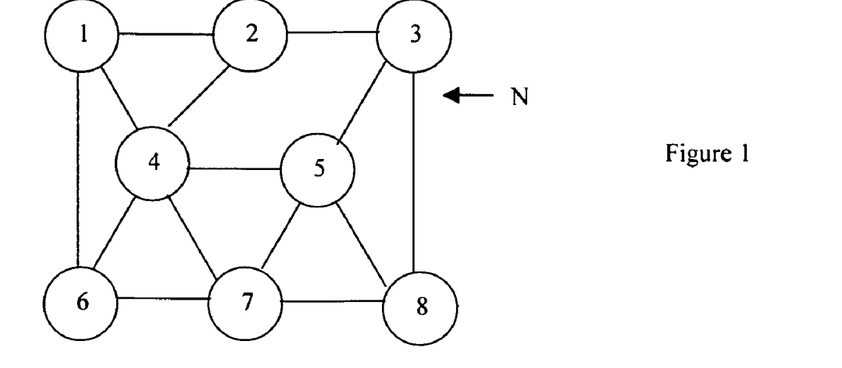
FIG. 1 is a basic network topology.
Figure 2:
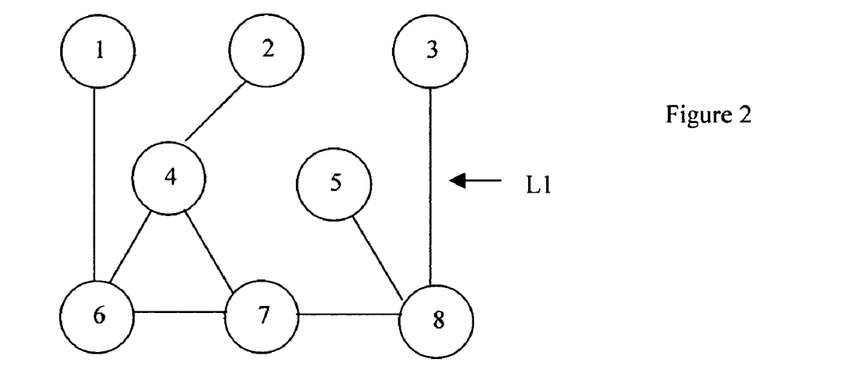
FIG. 2 is a first backup layer.
Figure 3:
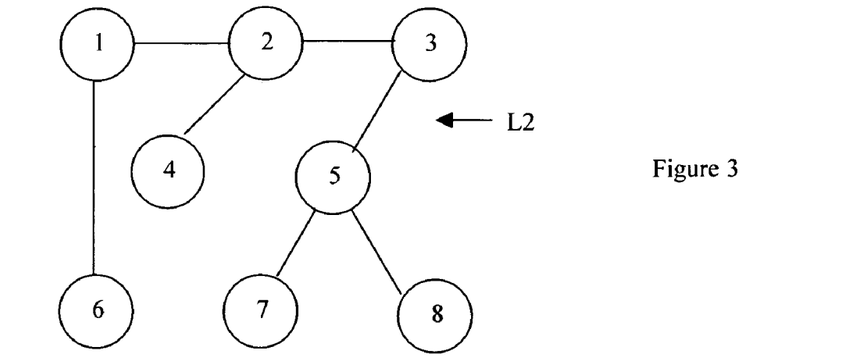
FIG. 3 is a second backup layer.

There will now be demonstrated a method for generating safe layers for all nodes by the following example, FIG. 1 being the starting point. This network N consists of eight nodes 1 to 8, and fourteen links, has no original articulation points. The resulting backup layers are shown in FIGS. 2 and 3. The first layer (L1) will be calculated starting with node 1 as a candidate safe node. Since node 1 is not an articulation point, i.e., its removal does not disconnect the network, remove links are removed and node 1 made a safe node. Node 2 is then analyzed and found eligible as a safe node in the same layer as node 1. The same is the case with node 3, but node 4 has become an articulation point, so node 4 is not safe i L1. Finally, layer L1 will be the safe layer of the nodes 1, 2, 3 and 5. Note that a layer may contain cycles as seen in layer L1.

When all remaining nodes are articulation points in L1, layer L2 is calculated. It starts with e.g., node 4, and covers nodes 4, 6, 7 and 8. In other words, this example network can be covered with only two layers. For reasonably sized networks, generation of layers could easily be done manually by a network manager.

To take advantage of the resilient routing layers, a packet network implementation must fulfil certain requirements. These requirements depend on whether the network operates in a connectionless or a connection-oriented manner. For a connectionless network, e.g., IP or Ethernet, each packet must be marked according to what layer is currently valid. If n is the maximum number of layers, $\log_2(n)$ bits in the packet header should identify the currently valid layer. The node that moves a packet to another layer, marks the packet header with the global identification of the new layer. In the case of failures, only traffic transiting the failed node should be moved to another layer. All packets not affected by the fault will still be routed based on the full topology. The node moving traffic to another layer must therefore know if a failed node is in the route of a packet. For local recovery, this is obviously fulfilled since it is the next hop that is failing. For global recovery, it is necessary that that the ingress node is aware of the entire route for the traffic.

For a connection-oriented network, e.g., MPLS, marking packets with a global layer identification is not necessary. Path signalling is performed as normal. For each layer a new set of paths must be signalled. As for connectionless networks, the node moving traffic from original paths to recovery paths must know what paths are affected by the failure. Referring to FIG. 2, if node 5 has failed, layer L1 is selected as a safe layer for node 5. Before node 5 fails, all traffic may use the full topology of FIG. 1, e.g., traffic from node 6 to node 3 may follow the path 6-4-5-3. When node 5 fails, traffic transiting node 5 must be routed according to layer 1, while other traffic can still be routed according to the full topology of the default configuration of FIG. 1.

In the case of local recovery, traffic is routed from node 6 to 4 according to the full topology. Node 4 detects the failure, and switches traffic to layer L1. The path for traffic between node 6 and node 3 will then be 6-4-7-8-3. If node 6 is notified about the failure (global recovery) of node 5, the transition to layer L1 could be done by node 6. The path would then be 6-7-8-3. Even if node 5 has failed, the method can still handle failures of nodes 1, 2 and 3.

If a failure is defined as permanent, new layers must be calculated based on the full topology without out the failed component.

Figure 4:
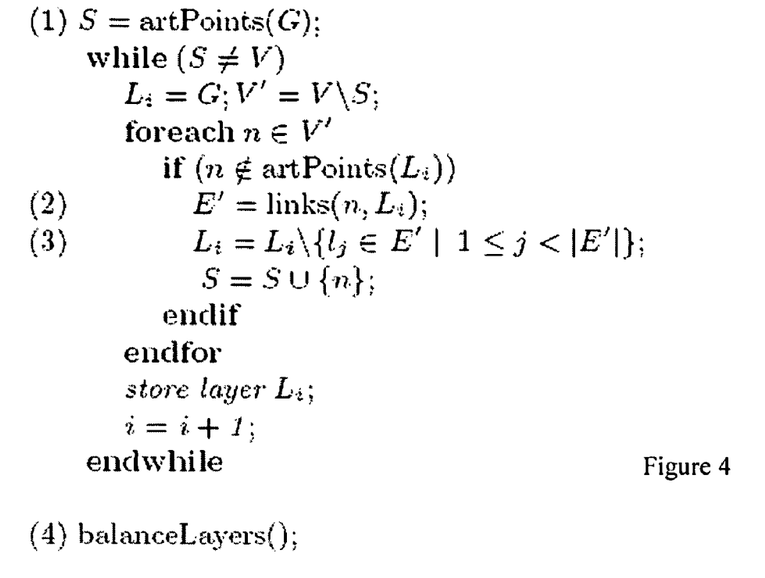
FIG. 4 shows a first algorithm.

There are numerous ways for choosing which nodes should be safe in which layer. RRL can be made to be optimized on many different criteria, and thus it displays significant flexibility. One alternative could be to have an algorithm generating a preferred fixed number of layers. For simplicity this section presents an algorithm making choices that in a very straightforward way attempts to minimize the number of layers. The algorithm calculates layers in the topology G=(V, E), where V is the set of nodes and E is the set of links. This algorithm is illustrated in FIG. 4.

Steps (1)-(4) deserve some comments.

(1): Set S keeps track of the processed nodes, i.e., nodes that are either articulation points or safe nodes in an already computed layer. Initially, all articulation points in G are added to set S. artPoints(G) finds all articulation points in G.

(2): All the adjacent links of the node (E'=links(n,$L_i$)) are found, and then (3): all adjacent links but one are removed from the current topology of the layer.

(4): So far, the algorithm attempts to make as many nodes as possible safe in the first layer. The first layer will then contain a majority of safe nodes. A typical distribution of safe nodes for a topology with 128 nodes could be 80, 36, and 12 for the resulting three layers. The layers with most safe nodes will contain fewer links and therefore offer more inefficient routing than other layers. To attain more equal routing performance in the layers, there is some post-processing of the layers to balance the number of safe nodes. This is done by moving safe nodes from the layers with a high degree of safe nodes to the layers with a low degree of safe nodes, with the requirement that they are not articulation points in the new candidate layer. In addition, it must be ensured that an unintended safe node is not made accidentally unsafe when adding links to the layer with a higher degree of safe nodes. The authors are not aware of any algorithm running in polynomial time that finds a guaranteed minimum number of layers. The proposed heuristic algorithm performs well, but does not provide any guarantees that the number of layers will indeed be minimal.

For an arbitrary node in an arbitrary graph, it can be determined whether the node is an articulation point in $O(|V|+|E|)$ (M. A. Weiss. Data Structures and Algorithm Analysis. Benjamin/Cummings, 1992). This articulation point test is done within a nested while- and for-loop. In a theoretical worst case there could be a need for one layer for each node in the network, and hence the while-loop will iterate $|V|$ times. The for-loop will for each while-iteration iterate $|V|-c$ times where c is the number of while-iterations currently accomplished. In worst case the total running time for these steps will then be $O(|V|^2 \cdot (|V|+|E|))$, which in all graphs of practical interest is $O(|V|^3)$. The balancing method runs with the same complexity, and hence the total running time is bound within $O(|V|^3)$.

With RRL, traffic affected by a failure will be routed according to the safe layer of the failed component. A backup layer has a reduced set of links compared to the full topology. This will of course have consequences for the length of the backup paths, as there are less links to choose from. However, it can be shown that whilst RRL backup paths are longer than the optimal backup paths, the differences are within acceptable bounds.

There is a trade-off between the number of layers, and backup path lengths. With more layers, each layer will contain less safe nodes, and thus more links will be available for routing. Increasing the number of layers will give more efficient backup routing.

Multiprotocol label switching (MPLS) is much used as a framework for network recovery, and traffic engineering in general. RRL is applicable for network protection within the MPLS framework. The method is by no means bound to MPLS, and may be applied to connectionless IP, Ethernet and other technologies as well.

MPLS is a connection-oriented technology and adhere therefore to the connection-oriented implementation requirements. In most cases as few as four layers suffice to cover relatively large networks. A network with four safe layers will calculate the LSP's for five topologies, the fifth topology being the original, error-free one.

Another requirement imposed by RRL is that the node carrying out the recovery action must know what LSP's are affected by the failed node or link. Then, only the traffic from affected LSP's will be moved to backup LSP's. For local recovery, the node detecting the failure is obviously aware of what LSP's are originally passing through the failed link or node. However, for global recovery, the ingress node is moving traffic to backup LSP's. The ingress node can be informed about all nodes of an LSP using, e.g., Record Route Object in RSVP.

Figure 5:
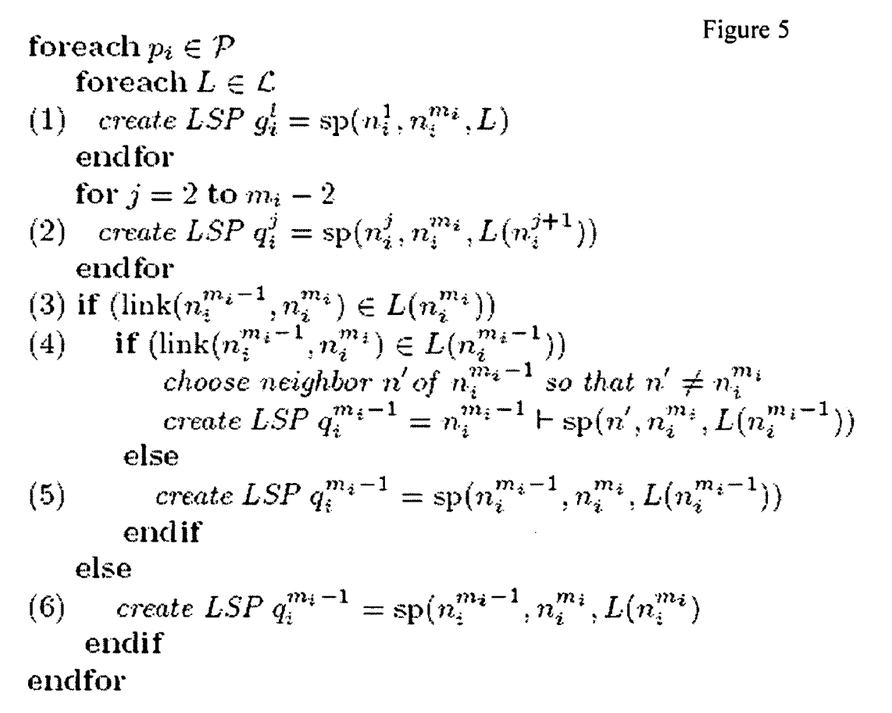
FIG. 5 shows a second algorithm.

LSP's for the layers can be created in several ways. A simple approach is, for each layer, to set up an LSP from each node to each candidate egress node, i.e., to each node that could possibly be used as egress for a network path. This approach is simple and provides protection also for later dynamically created LSP's. In addition, it allows any node in the network to switch layer. However, it would likely produce unnecessarily many protection LSP's. The second alternative is to operate similarly to the standard MPLS operation mode, and provide protection for the existing MPLS paths. In FIG. 5, there is shown an algorithm for calculating both global and local protection LSP's. In a network topology $G=(V,E)$, a set of primary LSP's $P=\{p_1, p_2, \ldots, p_n\}$, and a set of safe layers L are given. Let each $p_i$ be represented by the ordered set $\{n^1_i, n^2_i, \ldots, n^{m_i}_i\}$, where $m_i$ is the length of LSP $p_i$. The algorithm in FIG. 5 creates global backup LSP's $g^l_i$ in each layer $l \in L$ to backup a particular primary LSP $p_i$. In addition, it creates local backup LSP's $q^j_i$ from a particular point of repair $n^j_i$ in the primary LSP $p_i$.

In the algorithm of FIG. 5, $L(n)$ is the safe layer of node n in the topology G, and $\text{link}(n^j_i, n^{j+1}_i)$ is the link connecting nodes $n^j_i$ and $n^{j+1}_i$ in path $p_i$. $\text{sp}(a, b, G)$ calculates the shortest path from a to b in the topology G. Line (1) creates an end-to-end (global) backup LSP for $g_i$ in each layer 1 by finding the shortest path between the end points. Line (2) creates backup LSP's for local recovery. A backup LSP is created from the detecting node $(n^j)$ in the safe layer of the upstream node $(n^{j+1})$. The ingress node has been handled in line (2), and the special case with link failure for a link connected to an egress node is handled in lines (3) to (6).

Line (3) tests whether there exist a link to the egress node that is included in the safe layer of the egress node. If so, there are two alternatives. Line (4) covers the case where the link is also included in the safe layer of the detecting node (the upstream node). In that an LSP is created from the detecting node $n^{m_i-1}_i$, but making sure that there is used a deflection node n' as forced next hop. Line (5) covers the case where it is allowed to use the safe layer of the detecting node without deflection. Line (6) covers the case where the link is not in the safe layer of node $n^{m_i}_i$. Either the node detecting the failure or the ingress node of the primary LSP has to move traffic from original LSP's to backup LSP's in the case of a failure. If two node and link disjoint paths exist, MPLS global recovery (P. Pan et al. Fast reroute extensions to RSVP-TE for LSP tunnels. In IETF, Internet Draft, August 2004) requires one backup LSP per primary LSP. For local MPLS recovery, each primary LSP requires n−1 backup LSP's where n is the number of nodes in the LSP. When comparing this with the RRL MPLS specification, it is seen that both methods require $$\sum_{i=1}^{|P|} (m_i - 2)$$

backup LSP's for local recovery. For global recovery, standard MPLS requires $|P|$, while RRL MPLS requires $|P| \cdot |L|$ backup LSP's.

Some MPLS applications advise the local backup path to merge with the primary path as soon as possible after bypassing the failure, even if its not the shortest path. That is because the primary path is configured to fulfil all the service requirements of the traffic, which need not be the case for the backup path. RRL can also support such an approach. The local node detecting the failure establishes a backup LSP according to the safe layer of the failed node or link. This backup LSP will end in the first point in which it merges with the primary LSP. In case of failure, the detecting node then moves the traffic to the correct layer and stacks the corresponding header to the packets. This header will be popped at the merge point and the packet routed according to the full topology from there.

A second embodiments concerns the implementation of Multiple Routing Configurations (MRC) as discussed above.

MRC is based on using a small set of backup routing configurations, where each of them is resistant to failures of certain nodes and links. Given the original network topology, a configuration is defined as a set of associated link weights. In a configuration that is resistant to the failure of a particular node n, link weights are assigned so that traffic routed according to this configuration is never routed through node n. The failure of node n then only affects traffic that is sent from or destined to n. Similarly, in a configuration that is resistant to failure of a link 1, traffic routed in this configuration is never routed over this link, hence no traffic routed in this configuration is lost if 1 fails. In MRC, node n and link 1 are called isolated in a configuration, when, as described above, no traffic routed according to this configuration is routed through n or 1.

The MRC approach is threefold. First, there is created a set of backup configurations, so that every network component is isolated in one configuration. Second, for each configuration, a standard routing algorithm like OSPF is used to calculate configuration specific shortest path trees and create forwarding tables in each router, based on the configurations. The use of a standard routing algorithm guarantees loop free forwarding within one configuration. Finally, there is designed a forwarding process that takes advantage of the backup configurations to provide fast recovery from a component failure.

Figure 6:
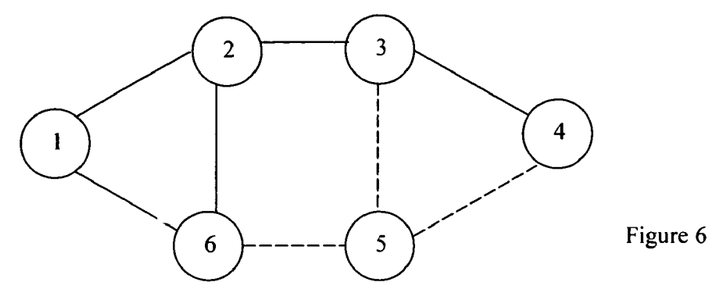
FIG. 6 shows a network configuration with an isolated node.

FIG. 6 illustrates a configuration where node 5 is isolated. In this configuration, the weight of the 5-3, 5-4 and 5-6 links is set so high that only traffic sourced by or destined for node 5 will be routed over these links, which are denoted restricted links. The legend shows the line style used to denote a restricted link, which applies also to FIGS. 7 and 8. Node failures can be handled through blocking the node from transiting traffic. This node-blocking will normally also protect the attached links. But a link failure in the last hop of a path can obviously not be recovered by blocking the downstream node. Hence, in one of the backup configurations, there must exist a valid path to the last hop node, without using the failed link. A link is isolated by setting the weight to infinity, so that any other path would be selected before one including that link.

Figure 7:
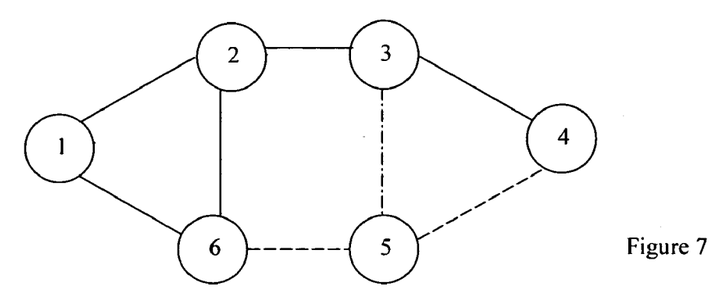
FIG. 7 shows a network configuration with an isolated node and a disabled link.

FIG. 7 shows the same configuration as FIG. 6, except now link 3-5 has been completely disabled, or isolated. The legend shows the line style used to denote a disabled link, which applies also to FIG. 8. No traffic is routed over the disabled link in this configuration; traffic to and from node 5 can only use the restricted links.

Figure 8:
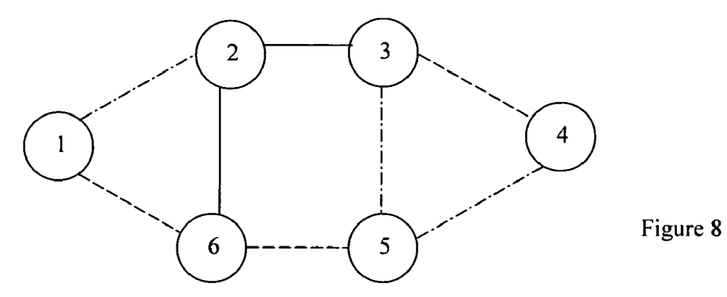
FIG. 8 shows a network configuration with a number of isolated nodes and inhibited or disabled links.

FIG. 8 shows how several nodes and links can be made safe in the same configuration. In a backup configuration like this, packets will never be routed over the disabled links 1-2, 5-3 and 5-4, and only in the first or the last hop will be routed over the restricted links 6-1, 6-5 and 3-4.

Some important properties of a backup configuration are worth pointing out. First, all non-isolated nodes are internally connected by a sub-graph that does not contain any isolated or restricted links. This sub-graph is denoted as the backbone of the configuration. In the backup configuration shown in FIG. 8, nodes 6, 2 and 3 with their connecting links constitute this backbone. Second, all links attached to an isolated node are either disabled or restricted, but an isolated node is always directly connected to the backbone with at least one restricted link. These are preferred properties of all backup configurations.

Using a standard shortest path calculation, each router creates a set of configuration-specific forwarding tables. For simplicity, when it is said that a packet is forwarded according to a configuration, it is meant that it is forwarded using the forwarding table calculated based on that configuration.

When a router detects that a neighbour can no longer be reached through one of its interfaces, it does not immediately inform the rest of the network about the connectivity failure. Instead, packets that would normally be forwarded over the failed interface are marked as belonging to a backup configuration, and forwarded on an alternative interface towards its destination. The packets must be marked with a configuration identifier, so the routers along the path know which configuration to use. Packet marking is most easily done by using the DSCP field in the IP header. If this is not possible, other packet marking strategies like IPv6 extension headers or using a private address space and tunneling can be imagined.

It is important to stress that MRC does not affect the failure-free original routing, i.e. when there is no failure, all packets are forwarded according to the original configuration, where all link weights are normal. Upon detection of a failure, only traffic reaching the failure will switch configuration. All other traffic is forwarded according to the original configuration as normal.

To guarantee single-failure tolerance and consistent routing, the backup configurations used in MRC must adhere to the following requirements: 1) A node must not carry any transit traffic in the configuration where it is isolated. Still, traffic must be able to depart from and reach an isolated node. 2) A link must not carry any traffic at all in the configuration where it is isolated. 3) In each configuration, all node pairs must be connected by a path that does not pass through an isolated node or an isolated link. 4) Every node and every link must be isolated in at least one backup configuration.

The first requirement decides what weights must be put on the restricted links attached to an isolated node. To guarantee that no path will go through an isolated node, it suffices that the restricted links have a weight W of at least the sum of all link weights w in the original configuration:

$$W > \Sigma_{e_{ij} \in \epsilon} \omega_{i,j}$$

This guarantees that any other path between two nodes in the network will be chosen by a shortest path algorithm before one passing through the isolated node. Only packets sourced by or destined for the isolated node itself will traverse a restricted link with weight W, as they have no shorter path. With a current algorithm, discussed below, restricted and isolated links are given the same weight in both directions in the backup configurations, i.e., they are treated as undirected links. However, this does not prevent the use of independent link weights in each direction in the default configuration.

The second requirement implies that the weight of an isolated link must be set so that traffic will never be routed over it. Such links are given infinite weight.

Given these restrictions on the link weights, there will now be shown how it is possible to construct backup configurations that adhere to the last two requirements stated above.

There will now be presented an algorithm, designed to make all nodes and links in a arbitrary bi-connected graph isolated. The algorithm will typically be run once at the initial startup of the network, and each time a node or link is permanently added or removed.

The algorithm takes as input the undirected weighted graph G, and the number n of backup configurations that is intended created. It loops through all nodes in the topology, and tries to isolate them one at a time. A link is isolated in the same iteration as one of its attached nodes. With the algorithm, all nodes and links in the network are isolated in exactly one configuration. The third property above results in the following two invariants for the algorithm, which must be evaluated each time a new node and its connected links are isolated in a configuration: 1) A configuration must contain a backbone; 2) All isolated nodes in a configuration must be directly connected to the backbone through at least one restricted link.

The first invariant means that when a new node is isolated, the sub-graph of non-isolated nodes must not be divided. If making a node isolated breaks any of these two requirements, then the node cannot be isolated in that configuration.

When isolating a node, there are also isolated as many as possible of the connected links, without breaking the second invariant above. A link is always isolated in the same configuration as one of its attached nodes. This is an important property of the produced configurations, which is taken advantage of in the forwarding process described below.

Figure 9:
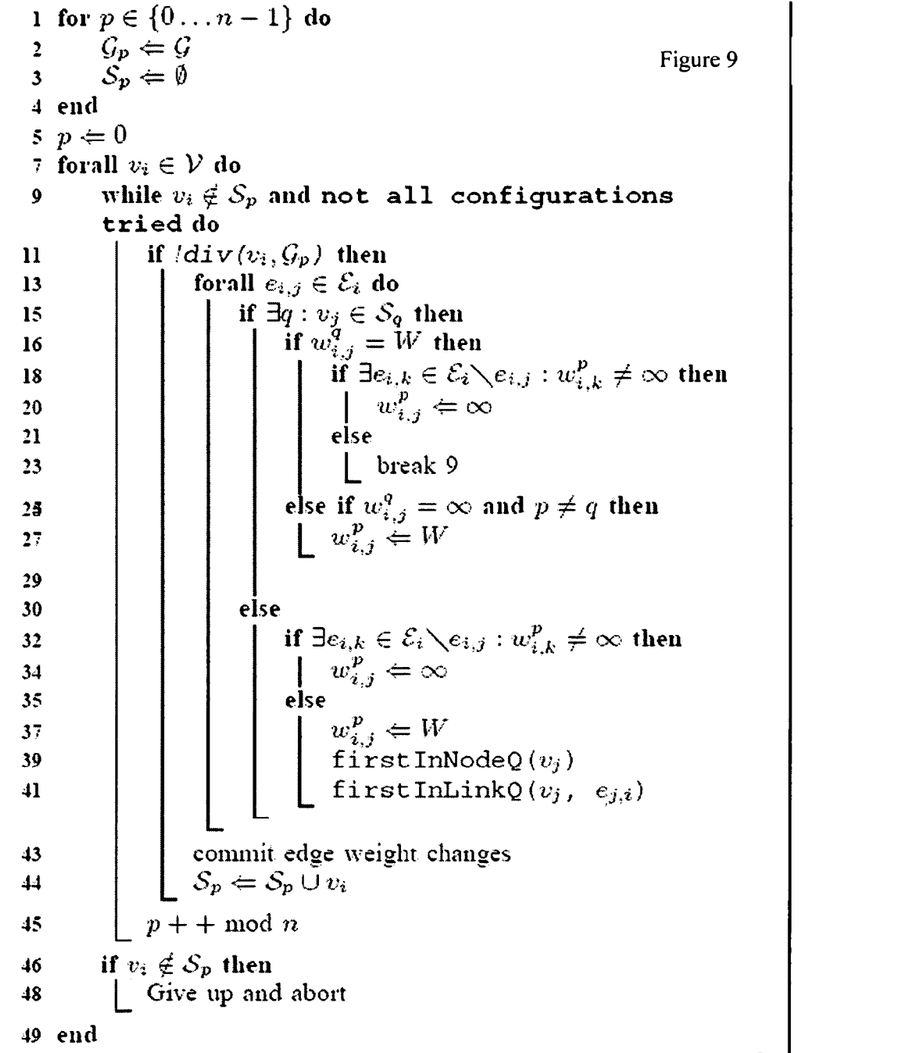
FIG. 9 shows a further embodiment of an algorithm.
Figure 10:
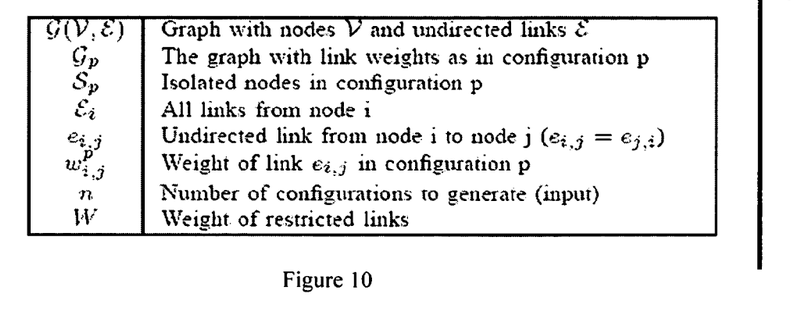
FIG. 10 shows a notation table.

The configuration generation algorithm is illustrated in FIG. 9 and will now be described in detail, using the notation shown in FIG. 10.

When an attempt is made to isolate a node $v_i$ in a backup configuration p, it is first tested that doing so will not break the first invariant above. The div method (for "divide") at line 11 decides this by testing that each of $v_i$'s neighbours can reach each other without passing through $v_i$, an isolated node, or an isolated link in configuration p.

Along with $v_i$, as many as possible of its attached links are isolated. The algorithm runs through all the attached links (line 13). The node $v_j$ in the other end of the link may or may not be isolated in some configuration already (line 15). If it is, a decision must be made whether the link should be isolated along with $v_i$ (line 20), or if it is already isolated in the configuration where $v_j$ is isolated (line 27). A link must always be isolated in the same configuration as one of its end nodes. Hence, if the link was not isolated in the same configuration as $v_j$, it must be isolated along with node $v_i$.

Before the algorithm can isolate the link along with $v_i$ it must test (line 18) that $v_j$ will still have an attached non-isolated link, according to the second invariant above. If this is not the case, $v_i$ can not be isolated in the present configuration (line 23). Giving up the node in the present configuration means restarting the outer loop (line 9). It is important to note that this also involves resetting all changes that has been made in configuration p trying to isolate $v_i$.

In the case that the neighbour node $v_j$ was not isolated in any configuration (line 29), the algorithm isolates the link along with $v_i$ if possible (line 34). If the link cannot be isolated (due to the second invariant), it is left for node $v_j$ to isolate it later. To make sure that this link can be isolated along with $v_j$, the algorithm must process $v_j$ next (line 39, selected at line 7), and link $e_{j,i}$ must be the first among $\epsilon_j$ to be processed (line 41, selected at line 13). This is discussed further below.

If $v_i$ was successfully isolated, the routine moves on to the next node. Otherwise, it keeps trying to isolate $v_i$ in every configuration, until all configurations are tried (line 9). If $v_i$ could not be isolated in any configuration, requirement 4 above could not be fulfilled. The algorithm will then terminate with an unsuccessful result (line 48). This means that the algorithm could not isolate all network elements using the required number of configurations, and a higher number of configurations must be tried. Note also that the heuristic algorithm does not necessarily produce the theoretical minimum number of backup configurations.

The complexity of the proposed algorithm is determined by the loops and the complexity of the div method. div performs a procedure similar to determining whether a node is an articulation point in a graph, bound to worst case $O(|V|+|E|)$.

Additionally, for each node, it runs through all adjacent links, whose number has an upper bound in the maximum node degree $\Delta$. In worst case, it is necessary to run through all n configurations to find a configuration where a node can be isolated. The worst case running time for the complete algorithm is then bound by $O(|V|n|E|\Delta)$.

The algorithm runs through all nodes trying to make them isolated in one of the backup configurations. If a node cannot be isolated in any of the configurations, the algorithm terminates without success. However, the algorithm is designed so that any bi-connected topology will result in a successful termination, if the number of configurations allowed is sufficiently high. For an intuitive proof of this, consider a situation where the number of configurations created is $|V|$. In this case, the algorithm will only isolate one node in each backup configuration. In bi-connected topologies any node can be removed, i.e. isolated, without disconnecting the network, and hence invariant 1 above is not violated. Along with a node $v_i$, all attached links except one ($e_{i,j}$) can be isolated. By forcing node $v_j$ to be the next node processed (line 39), and the link $e_{j,i}$ to be first among $E_j$ (line 41), it is guaranteed that $e_{j,i}$ and $v_j$ can be isolated in the next configuration. This can be repeated until there are configurations so that every node and link is isolated. This holds also for the last node processed, since its last link will always lead to a node that is already isolated in another configuration.

A ring topology is a worst-case example of a topology that would need $|V|$ backup configurations to isolate all network elements.

The algorithm presented above and illustrated in FIG. 9 creates a set of backup configurations. Based on these, a standard shortest path algorithm is used in each configuration, to calculate configuration specific forwarding tables. In this section, there is described how these forwarding tables are used to avoid a failed component.

When a packet reaches a point of failure, the node adjacent to the failure, called the detecting node, is responsible for finding the configuration where the failed component is isolated, and to forward the packet according to this configuration. With the current proposal, the detecting node must find the correct configuration without knowing the root cause of failure.

A node must know in which configuration the downstream node of each of its network interfaces is isolated. Also, it must know in which configuration it is isolated itself. This information is distributed to the nodes in advance, during the configuration generation process.

Figure 11:
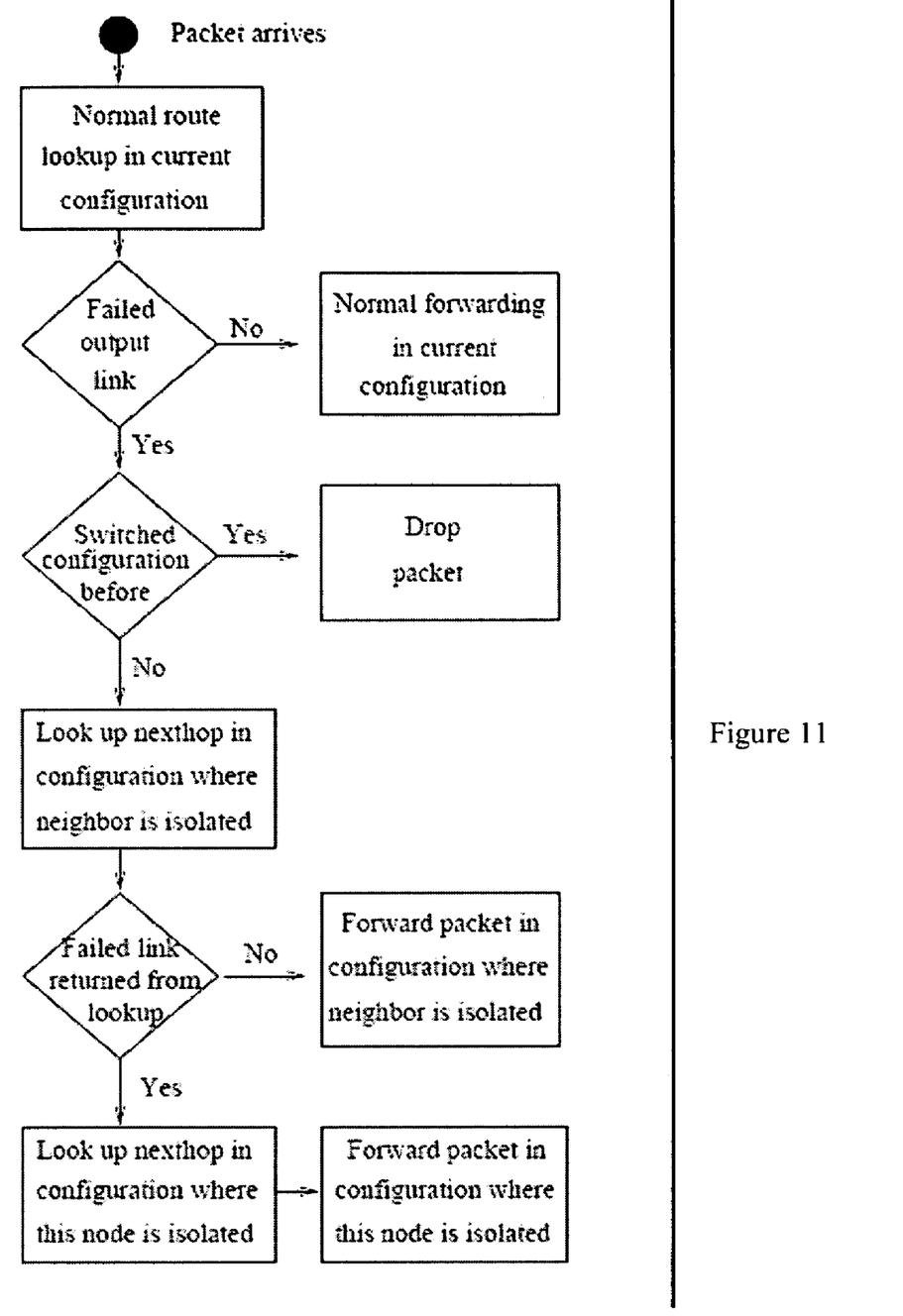
FIG. 11 shows a flow diagram in implementation of the invention.

The flow diagram in FIG. 11 shows the steps that are taken in a node's forwarding process. First, packets that are not affected by the failure, are forwarded as normal (step 2). Special measures are only taken for packets that would normally be forwarded through a broken interface.

In step 3, which is optional, packets that are already routed according to a backup configuration, i.e., they have been marked with a backup configuration identifier by another node, are discarded. Reaching a point of failure for the second time, means either that the egress node has failed, or the network contains multiple failed elements. To avoid looping between configurations, a packet is allowed to switch configuration only once. To allow protection against multiple failures, there could be a scheme where packets are allowed to switch configurations more than once. A separate mechanism would then be needed to keep packets from looping between two configurations, e.g. only allowing packets to be switched to a configuration with a higher ID.

There is then a next hop lookup in the configuration where the neighbour is isolated, in step 4. If the same broken link is not returned from this lookup, the packet is marked with the correct configuration identifier, and forwarded in this configuration (step 5). The packet is then guaranteed to reach its egress node, without being routed through the point of failure again. Only if the neighbour is the egress node for the packet, and the neighbour is indeed dead, will the packet reach a dead interface for the second time (in a single failure scenario). It will then be discarded in another node.

If, however, the dead link is returned from the lookup in the configuration where the neighbour is isolated, it is known that the neighbour node must be the egress node for the packet, since packets are never routed through an isolated node. In this case, a lookup in the configuration where the detecting node itself is isolated must be made (step 6). It is important to remember that a link is always isolated in the same configuration as one of its attached nodes. Hence, the dead link can never be returned from this lookup. Again, if the neighbour (egress) node is indeed dead, the packet will be discarded in another node upon reaching a dead interface for the second time.

For an example of how packet forwarding is done in the case of a failure in the last hop, consider the situation where a packet reaches a dead interface in flight from node to an egress node. In the last hop, packets will be forwarded in the configuration where either node is isolated, depending on where the link between them is isolated. If the link is not isolated in the same configuration as the egress node, a route lookup in this configuration will return the same broken link. Hence, a lookup must be made in the configuration where the preceding node is isolated. Note that if both nodes are isolated in the same configuration, the link connecting them is also isolated in that configuration. Packets will then always reach the egress in that configuration, even if it is the last hop link that fails, unless, of course, the egress node itself has failed.

While the backup configurations can be generated off line, and information can be represented in the network using Multi Topology routing mechanisms, the described forwarding process needs additional software functionality in the routers. The described forwarding process consists however of simple tests and next-hop lookups only, and should be easy to implement. The routers will need a mapping between each interface and a specific backup configuration. This mapping can be built when the configurations are created.

MRC is a local, proactive recovery scheme that resumes packet forwarding immediately after the failure is detected, and hence provides fast recovery. State requirements and the influence on network traffic are other important metrics. MRC requires the routers to store additional routing configurations. The amount of state required in the routers, is related to the number of such backup configurations. Since routing in a backup configuration is restricted, MRC will potentially give backup paths that are longer than the optimal paths. Longer backup paths will affect the total network load and also the end-to-end delay. However, MRC yields performance immediately after a failure, while IP reconvergence can take seconds to complete. MRC gives backup path lengths close to those achieved after a full OSPF re-convergence, and that the difference decreases further if the use of more configurations is allowed. This means that the affected traffic will not suffer from unacceptably long backup paths in the period when it is forwarded according to an MRC backup configuration.

The number of backup configurations required is modest, and typically 5 or less, and more frequently 3 or 4, is sufficient. The following number of backup configurations have been calculated for real world networks:

TABLE

| Network | Nodes | Links | Configurations |
| --- | --- | --- | --- |
| Sprint US | 32 | 64 | 4 |
| German Tel | 10 | 29 | 3 |
| DFN | 13 | 64 | 2 |
| Geant | 19 | 30 | 5 |
| Cost329 | 11 | 26 | 3 |

It will be appreciated that described embodiments are by way of example only are not to be used in limiting the scope of the invention, which is to be determined by the accompanying claims.

What is claimed is:

1. A method of routing data packets from a source to destinations over a network, the network comprising a plurality of nodes and a plurality of links interconnecting the nodes, wherein:

(a) each destination has a destination address; each data packet includes destination address data identifying the respective destination of the packet; and each node has pre-stored a default set of routing information including a default set of forwarding instructions for packets, and, on receipt of a packet by a node, the node reads the destination address data in the packet and uses the destination address data and the default set of routing information to determine a forwarding instruction, and the node forwards the packet to a neighboring node in the network in accordance with the forwarding instruction;

(b) each node has pre-stored a plurality of backup sets of routing information, each backup set corresponding to a respective backup network configuration and including a respective backup set of forwarding instructions for packets; in each backup network configuration, at least one node is made safe by being inhibited from transmitting data; and for each node in the network, there is at least one backup network configuration in which the node is made safe by being inhibited from transmitting data;

(c) when a first node forwards a packet to a second, neighboring node in the network in accordance with the default set of routing information and detects a fault in transmission of the packet to the second node, the first node chooses a backup set of routing information from the backup sets of routing information stored by the first node, the chosen backup set of routing information corresponding to a selected backup network configuration in which the second node is made safe;

(d) on subsequent receipt of the packet, the first node reads the destination address data in the packet and uses the destination address data and the backup set of routing information to determine a forwarding instruction; the first node modifies the packet by adding backup configuration data to the packet, the backup configuration data identifying the selected backup network configuration; and the first node forwards the modified packet, which includes both the destination address data and the backup configuration data, to a third, neighboring node in the network in accordance with the forwarding instruction determined using the chosen backup set of routing information;

(e) on receipt of the modified packet by the third node, the third node reads the backup configuration data in the modified packet to identify the selected backup network configuration, reads the destination address data in the modified packet, and uses the destination address data to determine a forwarding instruction by means of a backup set of routing information stored by the third node which corresponds to the selected backup network configuration identified from the backup configuration data in the modified packet; and the third node forwards the modified packet in accordance with the forwarding instruction; and (f) in at least one backup network configuration in which a node is made safe, the safe node is connected to the remainder of the network by a restricted link that has a backup weighting that is significantly higher than a default weighting that the link has in the default network configuration; and the restricted link is used to transmit data to the safe node only if the safe node is the final destination node for the data.

2. A method as claimed in claim 1, wherein in the event that the second node is the final destination in the network for the data, and the backup network configuration selected by the first node, in which the second node is made safe, results in unsuccessful routing of the data to the second node, the first node selects an alternate one of the backup network configurations, in which the first node is made safe, and on subsequent receipt of a packet, the first node reads the destination address data in the packet and uses the destination address data and the backup set of routing information corresponding to the alternate backup network configuration to determine a forwarding instruction, the first node modifies the packet by adding alternate backup configuration data to the packet, the alternate backup configuration data identifying the selected alternate backup network configuration; and the first node forwards the modified packet which includes both the destination address data and the alternate backup configuration data, to a neighboring node in the network.

3. A method as claimed in claim 1, wherein in each backup configuration a plurality of nodes are made safe by being inhibited from transmitting data, each safe node being connected to the remainder of the network by a respective restricted link that has a backup weighting that is significantly higher than a default weighting that the link has in the default network configuration; and the respective restricted link is used to transmit data to the respective safe node only if the safe node is the final destination node for the data.

4. A method as claimed in claim 1, wherein on said subsequent receipt of a packet by the first node, the first node uses the selected backup network configuration only in the event that, in accordance with the default network configuration, the packet would otherwise be forwarded to said second node.

5. A method as claimed in claim 1, wherein in a backup network configuration in which a node is made safe, the safe node is connected to the remainder of the network by a plurality of restricted links that have respective backup weightings that are significantly higher than the weightings that they have in the default network configuration; and the restricted links are used to transmit data to the safe node only if the safe node is the final destination node for the data.

6. A method as claimed in claim 1, wherein in a backup network configuration in which a node is made safe, the safe node is connected to the remainder of the network by a plurality of links, at least one of which disabled so that it will not transmit data, the remainder having a backup weighting significantly higher than in the default network configuration so as to transmit data to the safe node only if the safe node is the final destination node for the data.

7. A method as claimed in claim 1, wherein in a backup network configuration in which a node is made safe, said second, neighboring node is connected to the remainder of the network by a single link which may transmit data to and from the second, neighboring node.

8. A method of routing data packets from a source to destinations over a network, the network comprising a plurality of nodes and a plurality of links interconnecting the nodes, wherein:
(a) each destination has a destination address; each data packet includes destination address data identifying the respective destination of the packet; and each node has pre-stored a default set of routing information including a default set of forwarding instructions for packets, and, on receipt of a packet by a node, the node reads the destination address data in the packet and uses the destination address data and the default set of routing information to determine a forwarding instruction, and the node forwards the packet to a neighboring node in the network in accordance with the forwarding instruction;
(b) each node has pre-stored a plurality of backup sets of routing information, each backup set corresponding to a respective backup network configuration and including a respective backup set of forwarding instructions for packets; in each backup network configuration, at least one node is made safe by being inhibited from transmitting data; and for each node in the network, there is at least one backup network configuration in which the node is made safe by being inhibited from transmitting data;
(c) when a first node forwards a packet to a second, neighboring node in the network in accordance with the default set of routing information and detects a fault in transmission of the packet to the second node, a backup set of routing information is chosen, corresponding to a selected backup network configuration in which the second node is made safe;
(d) on subsequent receipt of the packet, the first node reads the destination address data in the packet and uses the destination address data and the backup set of routing information to determine a forwarding instruction; and the first node forwards the packet, which includes the destination address data, to a third, neighboring node in the network in accordance with the forwarding instruction determined using the chosen backup set of routing information;
(e) on receipt of the packet by the third node, the third node reads the destination address data in the packet, and uses the destination address data to determine a forwarding instruction by means of a backup set of routing information stored by the third node which corresponds to the selected backup network configuration; and the third node forwards the packet in accordance with the forwarding instruction; and
(f) in at least one backup network configuration in which a node is made safe, the safe node is connected to the remainder of the network by a restricted link that has a backup weighting that is significantly higher than a default weighting that the link has in the default network configuration; and the restricted link is used to transmit data to the safe node only if the safe node is the final destination node for the data.

9. A method as claimed in claim 8, wherein a source node notifies all the nodes in the network of the selected backup configuration.

10. A method of routing labeled data packets from a source to destinations over a network, the network comprising a plurality of nodes and a plurality of links interconnecting the nodes, wherein:
(a) each node has pre-stored a default set of label-switched paths corresponding to a default configuration of link weights for the network, and upon receipt of a packet the node reads the packet's label and uses the label to determine a forwarding instruction by means of the default set of label-switched paths, and forwards the packet to a neighboring node in the network in accordance with the forwarding instruction;
(b) each node has pre-stored a plurality of backup sets of label-switched paths, each backup set corresponding to a respective backup configuration of link weights for the network; wherein, in each backup configuration, at least one node is made safe by being inhibited from transmitting data; and wherein, for each node in the network, there is at least one backup configuration in which the node is made safe by being inhibited from transmitting data;

(c) when a first node forwards a packet to a second, neighboring node in the network and detects a fault in transmission of the packet to the second node, the first node chooses a backup set of label-switched paths corresponding to a selected backup configuration of link weights for the network in which the second node is made safe;

(d) on subsequent receipt of the packet, the first node uses the packet's label and the backup set of label-switched paths to determine a forwarding instruction; the first node modifies the packet by adding backup configuration data to the packet, the backup configuration data identifying the selected backup configuration of link weights for the network; and the first node forwards the modified, labeled packet, which includes the backup configuration data, to a third, neighboring node in the network in accordance with the forwarding instruction determined using the chosen backup set of label-switched paths;

(e) on receipt of the modified packet by the third node, the third node reads the backup configuration data in the modified packet to identify the selected backup configuration of link weights for the network, reads the modified packet's label and uses the label to determine a forwarding instruction by means of a backup set of label-switched paths stored by the third node which corresponds to the selected backup configuration of link weights for the network identified from the backup configuration data in the modified packet; and the third node forwards the modified packet in accordance with the forwarding instruction; and wherein (f) in at least one backup configuration of link weights for the network in which a node is made safe, the safe node is connected to the remainder of the network by a restricted link that has a backup weighting that is significantly higher than a default weighting that the link has in the default configuration of link weights for the network; and the restricted link is used to transmit data to the safe node only if the safe node is the final destination node for the data.

* * * * *